US009329009B1

(12) United States Patent
Moore

(10) Patent No.: US 9,329,009 B1
(45) Date of Patent: May 3, 2016

(54) MANUFACTURING PROCESS TO PRODUCE PROGRAMMED TERMINAL PERFORMANCE PROJECTILES

(71) Applicant: Alliant Techsystems Inc., Minneapolis, MN (US)

(72) Inventor: Scott E. Moore, Elk River, MN (US)

(73) Assignee: Vista Outdoor Operations LLC, Clearfield, UT (US)

( * ) Notice: Subject to any disclaimer, the term of this patent is extended or adjusted under 35 U.S.C. 154(b) by 0 days.

(21) Appl. No.: 14/216,421

(22) Filed: Mar. 17, 2014

Related U.S. Application Data

(60) Provisional application No. 61/792,030, filed on Mar. 15, 2013, provisional application No. 61/792,419, filed on Mar. 15, 2013.

(51) Int. Cl.
| | |
|---|---|
| *F42B 12/06* | (2006.01) |
| *F42B 30/02* | (2006.01) |
| *F42B 33/14* | (2006.01) |
| *F42B 33/00* | (2006.01) |

(52) U.S. Cl.
CPC ............. *F42B 33/00* (2013.01); *F42B 12/06* (2013.01); *F42B 30/02* (2013.01); *F42B 33/14* (2013.01); *Y10S 29/011* (2013.01); *Y10S 29/016* (2013.01); *Y10S 29/024* (2013.01)

(58) Field of Classification Search
CPC ........ F42B 12/06; F42B 12/367; F42B 30/02; F42B 33/14; Y10S 23/011; Y10S 23/016; Y10S 23/024
USPC ............................. 86/54, 55, 57, 1.1; 102/518
See application file for complete search history.

(56) References Cited

U.S. PATENT DOCUMENTS

| | | | | |
|---|---|---|---|---|
| 2,309,360 | A | * | 1/1943 | Southwell et al. ................. 86/55 |
| 3,143,966 | A | * | 8/1964 | Burns, Jr. et al. ............. 102/507 |
| 3,349,711 | A | | 10/1967 | Darigo et al. |
| 3,614,816 | A | * | 10/1971 | Weymuller et al. ............ 86/19.5 |

(Continued)

FOREIGN PATENT DOCUMENTS

| | | |
|---|---|---|
| DE | 21 26 351 C1 | 4/1978 |
| DE | 29 41 480 | 4/1980 |

(Continued)

OTHER PUBLICATIONS

Liu et al., "Comparative study on the shell power after high-energy-beam controlled fragmentation." Ordnance Material Science and Engineering, Jan. 2008, vol. 31, Issue 1, pp. 67-70 (4 pages).

(Continued)

*Primary Examiner* — Bret Hayes
(74) *Attorney, Agent, or Firm* — Christensen Fonder P.A.

(57) ABSTRACT

The present invention in some aspects is directed to small arms ammunition and programmed upset characteristics thereof imparted to them using lasers. More particularly, the invention relates to ammunition and methods of making ammunition having predetermined patterns of engraving and/or cutting or hardening and/or annealing imparted into the forward portion using a programming laser system adapted for treating projectiles to effect predetermined and consistent upset configurations. Lasers may be used in forming steps of the bullet core to provide petaling or other performance objectives before or after jacketing or without jacketing.

17 Claims, 3 Drawing Sheets

(56) References Cited

U.S. PATENT DOCUMENTS

| | | | |
|---|---|---|---|
| 3,791,881 A | 2/1974 | Hayes et al. | |
| 3,880,081 A | 4/1975 | Riffin et al. | |
| 4,151,014 A | 4/1979 | Charschan et al. | |
| 4,246,844 A | 1/1981 | Segmiller et al. | |
| 4,304,978 A | 12/1981 | Saunders | |
| 4,405,386 A | 9/1983 | Mravic et al. | |
| 4,467,168 A | 8/1984 | Morgan et al. | |
| 4,507,538 A | 3/1985 | Brown et al. | |
| 4,539,461 A | 9/1985 | Benedict et al. | |
| 4,610,061 A * | 9/1986 | Halverson | 86/55 |
| H238 H | 3/1987 | Adams | |
| 4,793,037 A | 12/1988 | Carter | |
| 5,040,464 A | 8/1991 | Pearson | |
| 5,095,821 A | 3/1992 | Merz | |
| 5,131,123 A | 7/1992 | Brooks | |
| 5,208,424 A | 5/1993 | Schluckebier et al. | |
| 5,375,529 A | 12/1994 | Knight, Jr. et al. | |
| 5,385,100 A | 1/1995 | Corzine et al. | |
| 5,385,101 A | 1/1995 | Corzine et al. | |
| 5,736,474 A | 4/1998 | Thomas | |
| 5,841,063 A * | 11/1998 | Hellkvist et al. | 102/481 |
| 5,943,749 A | 8/1999 | Swank | |
| 5,984,916 A | 11/1999 | Lai | |
| 6,013,140 A | 1/2000 | Simoneaux | |
| 6,209,459 B1 | 4/2001 | Kaufman et al. | |
| 6,502,575 B1 | 1/2003 | Jacobs et al. | |
| 6,613,165 B1 | 9/2003 | Alexander | |
| 6,629,485 B2 | 10/2003 | Vaughn et al. | |
| 6,659,013 B1 * | 12/2003 | Kellner | 102/516 |
| 6,727,125 B2 | 4/2004 | Adachi et al. | |
| 6,728,273 B2 | 4/2004 | Perry | |
| 6,772,041 B2 | 8/2004 | Inoue et al. | |
| 6,805,057 B2 | 10/2004 | Carr et al. | |
| 7,111,423 B2 * | 9/2006 | Lizotte et al. | 42/1.01 |
| 7,127,996 B2 | 10/2006 | Muth | |
| 7,162,942 B2 | 1/2007 | Dippold | |
| 7,171,905 B2 | 2/2007 | Hirt et al. | |
| 7,222,573 B2 | 5/2007 | Pontieri | |
| 7,259,351 B2 | 8/2007 | Lineton et al. | |
| 7,932,139 B2 | 4/2011 | Bu et al. | |
| 8,202,245 B2 | 6/2012 | Weber et al. | |
| 8,256,352 B2 | 9/2012 | Masinelli | |
| 8,304,686 B2 | 11/2012 | Sano et al. | |
| 8,310,367 B1 | 11/2012 | Vishwanath | |
| 8,545,994 B2 | 10/2013 | Facchini et al. | |
| 8,607,707 B1 * | 12/2013 | Arnon et al. | 102/439 |
| 2001/0004868 A1 | 6/2001 | Burckhardt et al. | |
| 2005/0005806 A1 * | 1/2005 | Mace et al. | 102/430 |
| 2005/0183617 A1 | 8/2005 | MacDougall | |
| 2006/0020259 A1 | 1/2006 | Baumeister et al. | |
| 2008/0184873 A1 * | 8/2008 | Martini Filho | 86/1.1 |
| 2009/0281529 A1 | 11/2009 | Carriazo | |
| 2010/0018430 A1 | 1/2010 | Masinelli et al. | |
| 2010/0087802 A1 | 4/2010 | Bischoff et al. | |
| 2010/0192797 A1 | 8/2010 | Seidel et al. | |
| 2011/0138672 A1 | 6/2011 | Abell et al. | |
| 2011/0208171 A1 | 8/2011 | Vogelsang et al. | |
| 2012/0234810 A1 | 9/2012 | Kudo et al. | |
| 2012/0298758 A1 | 11/2012 | Vishwanath | |
| 2013/0255524 A1 | 10/2013 | Simon et al. | |
| 2015/0033973 A1 | 2/2015 | Harvey | |

FOREIGN PATENT DOCUMENTS

| | | |
|---|---|---|
| DE | 38 25 912 | 11/1989 |
| DE | 10 2008 005 098 | 7/2009 |
| EP | 0 007 695 | 2/1980 |
| EP | 0 147 190 A1 | 7/1985 |
| EP | 1 546 634 A2 | 6/2005 |
| EP | 1 582 837 A1 | 10/2005 |
| EP | 1 582 837 B1 | 1/2014 |
| FR | 2 961 590 A1 | 12/2011 |
| GB | 1 503 143 | 3/1978 |
| GB | 2 013 842 | 8/1979 |
| WO | WO 2004/044515 | 5/2004 |
| WO | WO 2005/079163 A2 | 9/2005 |
| WO | WO 2013/081492 A1 | 6/2013 |

OTHER PUBLICATIONS

Mitsubishi Electric FA, Electron Beam Machines Product List. Accessed online Feb. 19, 2014, at: http://www.mitsubishielectric.com/fa/products/mecha/ebm/index_print.html (2 pages).

Rofin-Sinar Technologies, Inc., "Laser Marking of Metals." Accessed online Feb. 19, 2014, at: http://www.rofin.com/en/applications/laser_marking/metals/ (1 page).

Wikimedia Foundation, Inc., "Electron beam technology." Accessed online Feb. 19, 2014, at: http://en.wikipedia.org/wiki/Electron_beam_technology (3 pages).

\* cited by examiner

MANUFACTURING PROCESS TO PRODUCE PROGRAMMED TERMINAL PERFORMANCE PROJECTILES

CROSS-REFERENCE TO RELATED APPLICATIONS

This application claims the benefit of U.S. Provisional Patent Application No. 61/792,030, filed Mar. 15, 2013, and of U.S. Provisional Patent Application No. 61/792,419, filed Mar. 15, 2013, the disclosures of which are incorporated herein by reference in their entirety.

FIELD OF THE INVENTION

The present invention relates to small arms ammunition and programmed upset characteristics thereof imparted to them using lasers. More particularly, the invention relates to ammunition and methods of making ammunition having predetermined patterns of engraving and/or cutting or hardening and/or annealing imparted into the ogive and meplat regions using lasers to effect predetermined and consistent upset configurations.

BACKGROUND OF THE INVENTION

Jacketed bullets are well known in the art. Shaping and scoring the tips of bullets and the core or body can provide programmed performance in the sense of petaling or fragmenting upon impact. Such is typically done with suitable dies and machine tools which have repeatable performance but little flexibility, often multiple steps, and certainly the need to retool when a different cut or score pattern is desired.

Prior methods of manufacturing a bullet include those described in U.S. Pat. Nos. 7,171,905, 7,162,942, 5,943,749, 5,131,123, and those cited therein and referenced thereby. All of which are incorporated by reference in their entireties.

It would be desirable to provide ammunition and methods of making ammunition having predetermined and consistent upset configurations, wherein the method of manufacturing is efficient, consistent and flexible and involves fewer steps.

SUMMARY OF THE INVENTION

The present invention in some aspects is directed to small arms ammunition and programmed upset characteristics thereof imparted to them using lasers. More particularly, the invention relates to ammunition and methods of making ammunition having predetermined patterns of engraving and/or cutting imparted into the forward end, such as the ogive and meplat regions, into and/or through the jacket using lasers to effect predetermined and consistent upset configurations. It also relates to ammunition and methods of making ammunition having predetermined patterns of hardening and/or annealing imparted to the ogive and meplat regions using lasers to effect predetermined and consistent upset configurations. Lasers may be used in forming steps of the bullet core to provide petaling or other performance objectives before or after jacketing or without jacketing.

According to the present invention, through the selective laser treatment, that being cutting, engraving and combinations thereof, of a given pattern upon the meplat and/or ogive of a metallic jacketed bullet, terminal performance in regard to bullet upset upon contact with a target may be pre-programmed. The selective laser treatment of the present invention is accomplished through the use of a scanning laser system adapted for treating bullets. By programming the laser system for laser treating jackets following specific pattern applications, the user may pre-program the resulting bullets to exhibit certain terminal performance characteristics.

According to the present invention, through the selective heat treatment, that being annealing, hardening and combinations thereof, of a given pattern upon the melplat and/or ogive of a metallic jacketed bullet, terminal performance in regard to bullet upset upon contact with a target may be pre-programmed. The selective heat treatment of the present invention is accomplished through the use of a conventional scanning laser system sized for treating bullet jackets. By programming the laser system for heat treating jackets following specific pattern applications, the user may pre-program the resulting bullets to exhibit certain terminal performance characteristics.

In some aspects, the present invention is directed to a method of forming a bullet comprising:
 a) forming cup shaped jacket blank;
 b) providing a core;
 c) inserting the core into the jacket and forming the bullet;
 d) providing a scanning laser system capable of finely cutting and/or engraving specific patterns in bullet material; and
 e) laser cutting and/or laser engraving the front end portion of the jacket with a laser beam emitted from the scanning laser system in the shape of a predetermined pattern onto the jacket blank wall, the predetermined pattern symmetrical about an axis of the bullet.

In some aspects, the present invention is directed to a method of forming a jacketed bullet having a front end portion, comprising:
 a) forming cup shaped jacket blank;
 b) providing a core;
 c) inserting the core into the jacket and forming the bullet;
 d) providing a scanning laser system capable of annealing, hardening and/or other heat treating specific patterns in bullet material; and
 e) laser annealing, hardening and/or other heat treating the front end portion of the jacket with a laser beam emitted from the scanning laser system in the shape of a predetermined pattern onto the jacket blank wall, the predetermined pattern symmetrical about an axis of the bullet.

In some aspects, the present invention is directed to a method of forming a bullet comprising:
 a) forming a jacket blank;
 b) providing a core;
 c) inserting the core into the jacket and
 d) laser cutting or engraving through the jacket into the core at least 30% of a diameter of the bullet; and
 e) shaping the bullet.

In some aspects, the present invention is directed to a method of forming a bullet comprising:
 a) forming a jacket blank with a forward end;
 b) laser cutting or engraving the forward end of the jacket blank;
 c) providing a core;
 d) inserting the core into the jacket and
 e) shaping the bullet.

In some aspects, the present invention is directed to a method of forming a bullet comprising:
 a) forming a jacket blank with a forward end;
 b) providing a core;
 c) laser cutting or engraving the core in a pattern symmetrical about an axis
 d) inserting the core into the jacket and
 e) shaping the bullet.

In some aspects, the present invention is directed to a method of forming a bullet comprising:
a) providing a jacket blank with a forward end;
b) providing a core;
c) laser cutting or engraving the core in a pattern symmetrical about an axis
d) inserting the core into the jacket and
e) shaping the bullet.

In some aspects, the present invention is directed to a method of forming a jacketed bullet having an ogival front end portion, comprising the steps of:
a) providing and drawing a sheet metal blank into a cup shaped jacket blank having a flat bottom and a wall, wherein the sheet metal blank is made from a material suitable for use as cartridge bullet jackets;
b) providing a core having a first end and a second end;
c) forming the core in the cup shaped jacket blank against said bottom by swaging or molding the core directly into the cup shaped jacket blank;
d) providing a scanning laser system capable of finely cutting and/or engraving specific patterns in the sheet metal blank material; and
e) laser cutting the cup shaped jacket blank at the bottom with a laser beam emitted from the scanning laser system in the shape of a predetermined pattern into the cup shaped jacket blank wall.

In some aspects, the present invention is directed to a method of forming a jacketed bullet having an ogival front end portion, comprising the steps of:
a) providing and drawing a sheet metal blank into a cup shaped jacket blank having a flat bottom and a wall, wherein the sheet metal blank is made from a material suitable for use as cartridge bullet jackets;
b) providing a core having a first end and a second end;
c) forming the core in the cup shaped jacket blank against said bottom by swaging or molding the core directly into the cup shaped jacket blank;
d) providing a scanning laser system capable of finely cutting and/or engraving specific patterns in the sheet metal blank material; and
e) laser engraving the cup shaped jacket blank at the bottom with a laser beam emitted from the scanning laser system in the shape of a predetermined pattern into the cup shaped jacket blank wall.

In some aspects, the present invention is directed to a method of forming a jacketed bullet having an ogival front end portion, comprising the steps of:
a) providing and drawing a sheet metal blank into a cup shaped jacket blank having a flat bottom and a wall, wherein the sheet metal blank is made from a material suitable for use as cartridge bullet jackets;
b) providing a core having a first end and a second end;
c) forming the core in the cup shaped jacket blank against said bottom by swaging or molding the core directly into the cup shaped jacket blank;
d) providing a scanning laser system capable of finely annealing and/or hardening specific patterns in the sheet metal blank material; and
e) laser annealing the cup shaped jacket blank at the bottom with a laser beam emitted from the scanning laser system in the shape of a predetermined pattern into the cup shaped jacket blank wall.

In some aspects, the present invention is directed to a method of forming a jacketed bullet having an ogival front end portion, comprising the steps of:
a) providing and drawing a sheet metal blank into a cup shaped jacket blank having a flat bottom and a wall, wherein the sheet metal blank is made from a material suitable for use as cartridge bullet jackets;
b) providing a core having a first end and a second end;
c) forming the core in the cup shaped jacket blank against said bottom by swaging or molding the core directly into the cup shaped jacket blank;
d) providing a scanning laser system capable of finely annealing and/or hardening specific patterns in the sheet metal blank material; and
e) laser hardening the cup shaped jacket blank at the bottom with a laser beam emitted from the scanning laser system in the shape of a predetermined pattern into the cup shaped jacket blank wall.

Some aspects of the present invention include a jacketed bullet made by the methods above and a cartridge comprising such jacketed bullets.

Still further, the method may comprise the further step of forcing a first end of the cup shaped jacket blank containing the core against the bottom of the cup shaped jacket blank into a concave cavity of a forming tool to deform the end of the cup shaped jacket blank into an ogival front end portion of the bullet in order to shape the bullet. The bullet may also be crimped to lock it in place and ensure that the core remains inserted within the first end of the cup shaped jacket blank. Additionally, the method may include the further step of forming a hollow at a center portion of the bottom of the cup shaped jacket blank.

In certain aspects of the invention, the core is made from a malleable metal. Suitably lead, lead alloy, tungsten, tungsten alloys, carbon, carbon fiber, metal containing composites, and mixtures thereof.

In some aspects, the jacket material may be of a suitable material, such as brass alloy, copper, copper alloy, aluminum, zinc alloys, carbon and mixtures thereof.

In some aspects of the invention methods disclosed, the laser hardening includes the step of: directing a laser beam onto the surface of the cup shaped jacket blank in the shape of the pattern at sufficiently high power densities to cause an incandescent reaction above the cup shaped jacket blank melting temperature with the cup shaped jacket blank; and limiting the incandescent reaction at a given area of the cup shaped jacket blank surface to a sufficiently short period of time to prevent any substantial melting.

In some aspects, the methods include the additional step of pre-conditioning the cup shaped jacket blank prior to the laser directing step by black oxide coating the surface of the cup shaped jacket blank which is absorbtive of the wavelength of the laser beam.

In some aspects, the methods of annealing and/or hardening include the additional step of quenching the cup shaped jacket blank with a gaseous jet.

In some aspects, the methods include the additional step focusing the laser beam into a narrow line where it intersects the cup shaped jacket blank; and traversing the laser beam along the cup shaped jacket blank with the laser beam line oriented in a direction generally perpendicular to the traverse direction in the shape of the pattern.

In still further aspects of the invention there is included a method of heat treating a jacket for a jacketed bullet made of a transformation hardenable material without substantial distortion. Such method comprising the steps of: providing a metal blank, wherein the metal blank is made from a material suitable for use as cartridge bullet jackets; directing a laser beam to the outside surface of the metal blank at sufficiently high power densities so as to cause a substantially instantaneous incandescent reaction above the melting temperature of the material with the metal blank; and traversing the laser beam along the outside surface of the metal blank in a predetermined pattern, whereby a heat-treated pattern in the shape of the predetermined pattern is formed on the metal blank, limiting the dwell time of the laser beam at any given point on the surface of the metal blank to prevent any substantial melting of the metal blank, wherein the metal blank is shaped into a cup shape having an ogival front end portion and formed for suitable use in a jacketed bullet.

In an aspect of the invention, the bullet being formed can have an added layer or layers of material that is particularly amenable to heat treating processes, for example ferrous based alloys or other alloys. The layer in the bullet can have a cap or jacket. In some embodiments, the cap layer may be below the copper or copper alloy jacket permitting the isolated regional heat treatment of the cap even though visually the cap or layer of material is not directly, visually, exposed. In an embodiment, the invention includes the selection of heat treatable alloys that are particularly amendable to heat treating, providing said alloy in a form near or at the surface of the bullet so that it is exposable to laser heating, and laser heating the bullet.

In an aspect of the invention, the bullet being formed can have an added layer or layers of material welded together as part of the heat treatment process. This is particularly advantageous where layers do not necessary bond together well and may be subject to premature separation. Isolated heating to weld the layers together precludes the premature delamination and permit, for example, use of thinner layers.

In aspects of the invention, conventional known processes of heat treating bullets can be supplemented with laser heat treating. For example in a process where bullets are heated and cooled for particular process times, discrete regional areas on the bullet can be provided with differential heating from the ambient conditions and the "gross" heating conventionally imparted to the bullets by wide spread radiant or convective heating.

The heat treating can be controlled by control processors (computers) such as described in the references incorporated by reference.

The present invention further includes aspects such as jacketed bullets having jackets treated by the methods disclosed herein, cartridges comprising such jacketed bullets and jacketed bullets comprising a jacket and a core, wherein the jacket is cup shaped and the core is positioned within the jacket and wherein the jacket is laser cut with a laser cut pattern. Further aspects include a jacketed bullet comprising a jacket and a core, wherein the jacket is cup shaped and the core is positioned within the jacket and wherein the jacket is laser engraved with a laser engraved pattern.

The present invention further includes aspects such as jacketed bullets having jackets treated by the methods disclosed herein, cartridges comprising such jacketed bullets and jacketed bullets comprising a jacket and a core, wherein the jacket is cup shaped and the core is positioned within the jacket and wherein the jacket is laser annealed with a laser annealed pattern. Further aspects include a jacketed bullet comprising a jacket and a core, wherein the jacket is cup shaped and the core is positioned within the jacket and wherein the jacket is laser hardened with a laser hardened pattern.

The methods disclosed herein utilizing a laser system for cutting, engraving, annealing and/or hardening may include, directing the laser beam at the surface of a jacketed bullet, a jacket blank and/or a core at a position consistent with the desired pattern and at an angle which is perpendicular (90°) to the tangent of the targeted surface point. The beam follows the preprogrammed pattern on the surface of the target, maintaining the 90° angle.

In some aspects, the pattern or predetermined patterns created by the methods or exhibited by the bullets herein may be in the form of a star, a 4 point star, a 5-point star, an "X", a circle, a square, a triangle, a circled "X", an equilateral cross, or confronting chevrons.

In other embodiments, the core of a bullet or an unjacketed bullet can be laser cut to provide petaling guides extending deep into or through the bullet. The traditional steps of punching and swaging or coning can be reduced or minimized by using a laser for shaping cutting purposes. The precise cutting provided by a laser can improve quality control and consistent performance over traditional punching and forming methods. This can provide better accuracy.

In an aspect of the invention, the bullet being formed can have an added layer or layers of material that is particularly amenable to laser cutting, for example alloys that have specific fillers. The layer bullet can have a cap or jacket.

An aspect of the invention may include a bullet forming apparatus comprising mechanical metal forming equipment and a laser cutting tool, a conveyance system, bullet fixturing, and a control processor to control the elements of the system.

The aspects and embodiments of the present invention are advantageous due to the flexibility they provide in dictating terminal performance. They provide the ability of promoting, controlling and designing for consistent predetermination of mushrooming and/or fragmentation of a jacketed bullet, which is desirable to the end user. The invention provides for faster and more consistent preparation of jackets with desired features. Automated control of laser equipment provides easy change of cutting patterns, including depths, thicknesses, etc. without changing tooling. Manufacturing equipment may be replaced or more easily altered for new designs than conventional methods, such as altering jacket thickness, skiving, altering hardness and core material. The flexibility and simplicity in which jackets and cores and combined jackets and cores may be tailored translates into reduced costs. The present invention provides for methods that give the user a greater choice of controlled expanding or mushrooming small caliber bullets. The manufacturing methods provides for a more consistency in dependable and predictable expanding bullets. The methods herein provide for an easier and quicker way of moving from one design to another.

The above summary of the various representative aspects of the invention is not intended to describe each illustrated aspect or every implementation of the invention. Rather, the aspects are chosen and described so that others skilled in the art can appreciate and understand the principles and practices of the invention. The figures in the detailed description that follow more particularly exemplify these aspects.

Still other objects and advantages of the present invention and methods of construction of the same will become readily apparent to those skilled in the art from the following detailed description, wherein only the preferred embodiments are shown and described, simply by way of illustration of the best mode contemplated of carrying out the invention. As will be realized, the invention is capable of other and different embodiments and methods of construction, and its several details are capable of modification in various obvious respects, all without departing from the invention. Accordingly, the drawing and description are to be regarded as illustrative in nature, and not as restrictive.

BRIEF DESCRIPTION OF THE DRAWINGS

The invention can be completely understood in consideration of the following detailed description of various aspects of the invention in connection with the accompanying drawings, in which.

Figure 1:
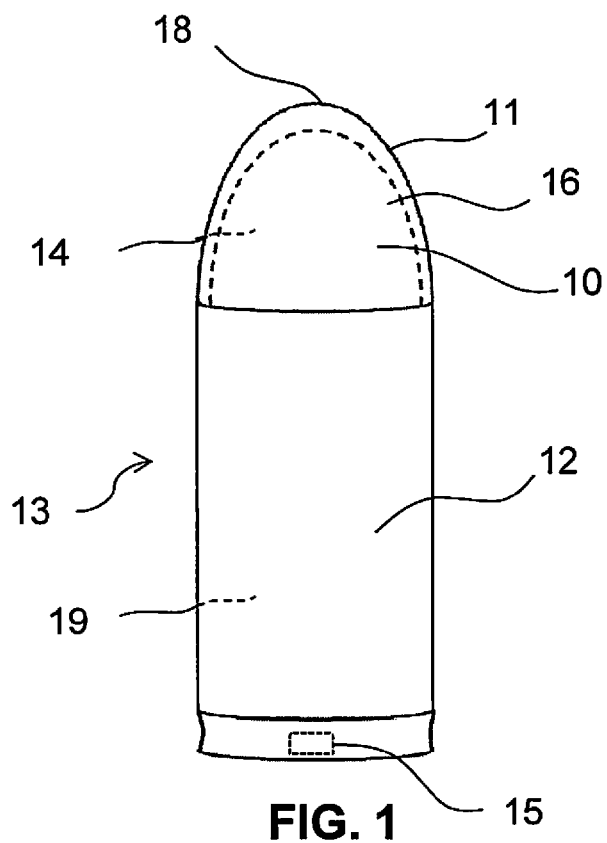
FIG. 1 is a side view of a cartridge with certain aspects in phantom according to certain aspects of the present invention.

While the present invention is amenable to various modifications and alternative forms, specifics thereof have been shown by way of example in the drawings and will be described in detail. It should be understood, however, that the intention is not to limit the present invention to the particular aspects described. On the contrary, the intention is to cover all modifications, equivalents, and alternatives falling within the spirit and scope of the present invention as defined by the appended claims.

DETAILED DESCRIPTION OF THE INVENTION

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated. The figures are used for both laser cutting or engraving and heat treating via annealing or hardening.

The invention is related to projectiles and methods to produce the inventive projectiles. More particularly, the invention relates to ammunition and methods of making ammunition having predetermined patterns of engraving and/or cutting imparted into the ogive and meplat regions using lasers to effect predetermined and consistent upset configurations.

The invention is further related to projectiles and methods to produce the inventive projectiles. More particularly, the invention relates to ammunition and methods of making ammunition having predetermined patterns of hardening and/or annealing imparted into the ogive and meplat regions using lasers to effect predetermined and consistent upset configurations.

According to the present invention, through the selective laser treatment, that being cutting, engraving and combinations thereof, of a given pattern upon the melplat and/or ogive of a metallic jacketed bullet, terminal performance in regard to bullet upset upon contact with a target may be pre-programmed. The selective laser treatment of the present invention is accomplished through the use of a scanning laser system adapted for treating bullet jackets. By programming the laser system for laser treating jackets following specific pattern applications, the user may pre-program the resulting bullets to exhibit certain terminal performance characteristics.

Further according to the present invention, through the selective heat treatment, that being annealing, hardening and combinations thereof, of a given pattern upon the melplat and/or ogive of a metallic jacketed bullet, terminal performance in regard to bullet upset upon contact with a target may be pre-programmed. The selective heat treatment of the present invention is accomplished through the use of a conventional scanning laser system sized for treating bullet jackets. By programming the laser system for heat treating jackets following specific pattern applications, the user may pre-program the resulting bullets to exhibit certain terminal performance characteristics. Such patterns can be altered from bullet to bullet and batch to batch.

Figure 2:
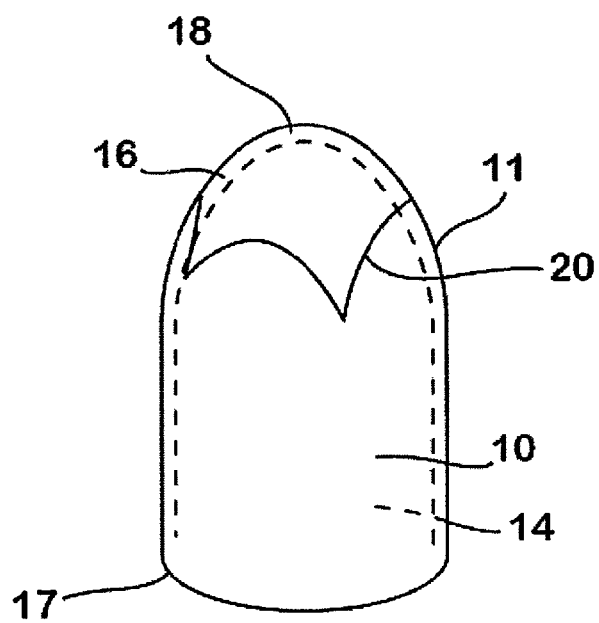
FIG. 2 is a side perspective view of a bullet with certain aspects in phantom according to certain aspects of the present invention.
Figures 3A, 3B, 3C:
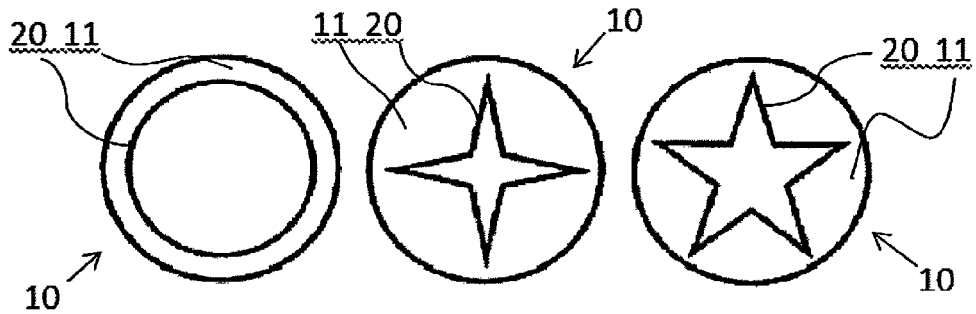
FIGS. 3A-3I are top side views of bullets with certain patterns according to certain aspects of the present invention.
Figures 3D, 3E, 3F:
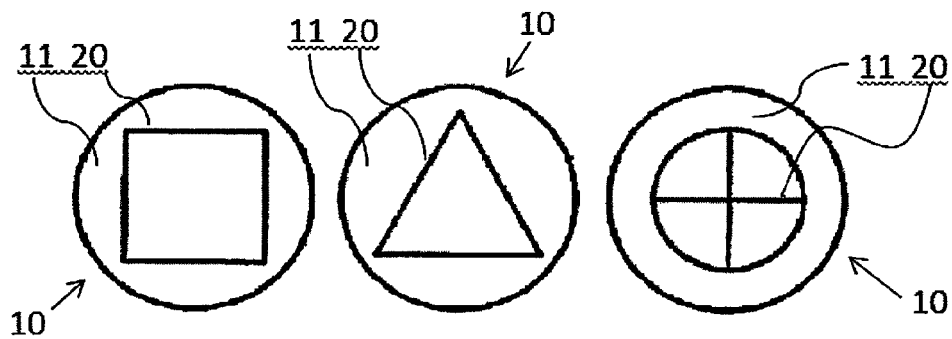
Figures 3G, 3H, 3I:
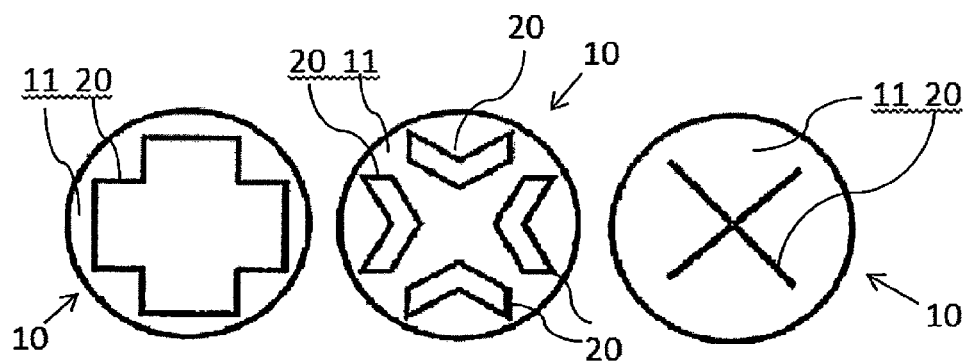

FIGS. 1 and 2 are side views illustrating aspects of the present invention. In FIG. 1, there is shown a perspective view of a conventional jacketed bullet 10 loaded into a cartridge case 12 to form a cartridge 13. A cartridge (also called a round, a shell or ammunition) packages a bullet 10, propellant (usually either smokeless powder or black powder) and a primer within a metallic, paper, or plastic cartridge casing 12 that is precisely made to fit within the firing chamber of a firearm. The cartridge 13 and bullet 10 of the present invention may comprise various designs. As such, this figure shall not be considered limiting, as it is used for general illustrative purposes.

Jacketed bullet 10 includes a jacket 11 which has a generally cylindrical body portion, a generally ogival front end portion 16, and a hollow open recess or cavity. The hollow open recess or cavity typically contains a core 14 (shown in phantom lines), which is preferably formed of a malleable metal or a composite comprising metal. The jacket 11 covers at least a major portion of the core body portion 14, including the ogival front end portion 16. At the base or rear end 17 of the bullet 10, the jacket 11 may cover the entire core 14 or it may cover a portion, leaving an opening in the base 17. The present invention also contemplates hollow point bullets which include a hollow open cavity at point 18 in the jacket 11. The jacket 11 may be made of suitable material, including, but not limited to, a malleable metal such as a copper or copper alloys. Such combinations of jacket and core are well known in the art and well within the knowledge and abilities to design and make of one skilled in the art.

FIG. 2 shows an isolated perspective view of the jacketed bullet 10 with an aspect of the cutting or engraving and/or the annealing or hardening pattern 20 of the invention shown imparted to the jacket 11. The front end portion 16 is shown as ogival in shape, but it should be understood that the front end portion may vary in shape and fall within the aspects of the present invention. The cavity housing the core 14 may have a curved profile or may have a generally conical profile having a straight sidewall. The choice depends on the caliber and the precision of the tooling necessary to form the cavity.

Figure 4:
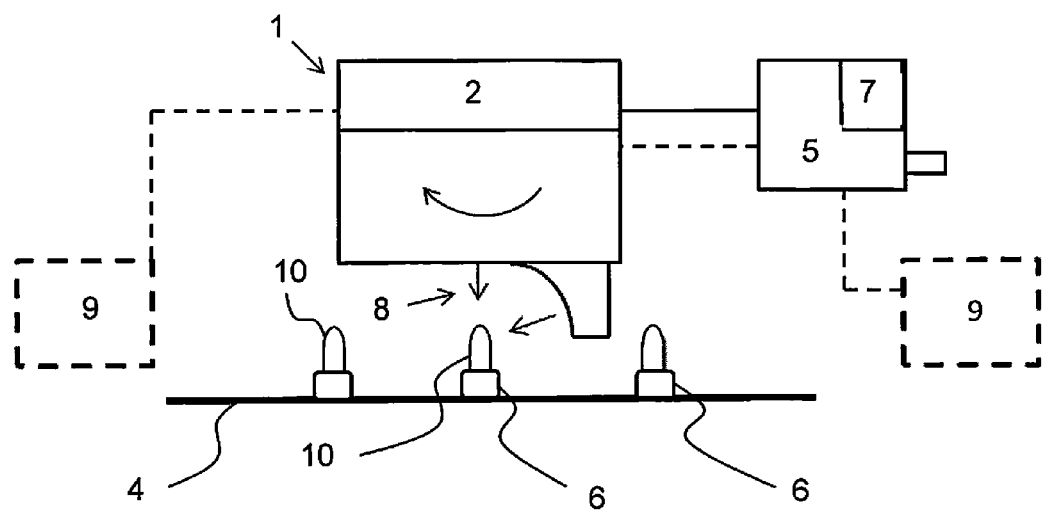
FIG. 4 is a block diagram of a system in accord with the inventions herein.

According to the present invention, selective laser treatment may be used for the cutting, engraving, annealing, hardening and combinations thereof of a given pattern upon the meplat and/or ogive of a metallic jacketed bullet and/or on the core. The selective laser treatment of the present invention may be accomplished through the use of a scanning laser system 1 adapted for treating bullet jackets. FIG. 4 illustrates a scanning laser system 1. The scanning laser system may include a laser machine 2 with conveyance equipment 4, control processor (computer) with memory 7, and bullet fixtures 6. The laser system 1 is arranged to provide the cutting or engraving laser beam 8 around and directed at the tip of the bullet. It may further be arranged to provide the annealing, hardening or other heat treating by laser beam 8 positionable around and directed at the tip of the bullet. The use of the laser allows instant variation in cutting patterns of bullets without the need for retooling. The use of the laser machine 2 allows instant variation in cutting patterns of bullets 10 without the need for retooling. Conveyance of bullets 10 in fixtures 6, operating of the laser system laser machine 2 and equipment, as well as cutting, engraving, annealing and/or hardening patterns are controlled by the control processor and patterns may be stored in the memory 7. The control processor 5 may control other forming, handling, and packaging equipment as illustrated by the dashed lines 9. By programming the laser system for laser treating jackets following specific pattern applications, the user may pre-program the resulting bullets to exhibit certain terminal performance characteristics.

When firing, the laser beam 8 is directed at the surface of a jacketed bullet 10 or core at a position consistent with the desired pattern and at an angle which is perpendicular (90°) to the tangent of the targeted surface point of the jacket or core or jacket/core combination. The beam 8 follows the preprogrammed pattern on the surface of the target, maintaining the 90° angle.

In certain aspects of the invention, the jacket 11 is laser treated by imparting on and in the material of the jacket 11 patterns of cutting or engraving. Non-limiting examples of patterns are shown in FIGS. 3A-3I. It should be understood that the present invention also contemplates using the present methods of laser cutting and/or engraving the jacket to duplicate any pattern of cutting, scoring or weakening the jacket currently within the field of art. The laser cutting and/or engraving of the present invention may be done before the jacket 11 material is swaged into its final form or after. The patterns may also be imparted after the core 14 is inserted and even after the jacket/core is fitted with a cartridge case.

The laser engraving and/or cutting of jackets 11 following each of the patterns shown in FIGS. 3A-3I may result in a different terminal performance in regard to bullet upset upon contact with a target. The engraving and/or cutting may create lines of demarcation from which petals are formed upon upset. As such, criteria such as penetration, weight loss or fragmentation of the core upon upset, proper petal expansion and performance through barrier materials, and damage can be readily programmed by specifying certain patterns. The use of lasers affords greater flexibility in pattern choice and provides accuracy, consistency and reliability. Upset may also depend on other factors, such as projectile velocity and particular jacket alloy characteristics. As such, the present invention further includes the cutting/engraving of patterns in the jacket in combination with the choosing of certain jacket alloys and projectile velocities. In embodiments, the bullets may be swaged or pressed after cutting or engraving with the laser.

In some aspects of the present invention, a method of forming the jacketed bullet 10 in accordance with the invention having an ogival front end portion 16 comprises the steps of
a) drawing and providing a sheet metal blank made of a material suitable for use as ballistic cartridge jackets into a cup shaped jacket blank having a flat bottom and a generally uniform thickness wall;
b) forming a malleable metal core in the cup shaped jacket blank against said bottom by swaging or molding the core directly into the blank;
c) providing a laser system capable of finely cutting and/or engraving specific patterns in the material;
d) cutting and/or engraving the jacket material at the bottom with the laser system in the shape of a predetermined pattern into the jacket wall; and
e) forcing the end of the blank containing the core against the bottom of the blank into a concave cavity of a forming tool to deform the end of the blank into an ogival front end portion 16 of the bullet 10.

Finally, the rear end 17 of the blank is crimped over the rear of the core 14 to lock it in place and ensure that the core 14 remains inserted within the front end 16 of the jacket 11.

In embodiments, the jackets may be cut and/or engraved prior to the step of joining the jacket to the core. Such prejoining cutting can allow more precise cutting and/or engraving through patterning of the jacket without disruption of the underlying core material. Subsequent swaging or pressing can create specific surface designs where the core material is exposed in precise patterns or designs, including indicia or markings.

In embodiments, the core material can be laser cut prior to being jacketed. This can provide cuts and/or engravings that may be a guide for petaling, allowing for the skipping or simplifying of discrete steps, for example coning or swaging. In other embodiments, deep cutting and/or engraving may be made through the jacket and core. In such instances the bullet may be re-coned or swaged to close gaps.

Laser cutting in the context of the present invention can mean completely separating the material along a line or cutting into the material a depth of more than 0.050 inches, for example. Laser engraving in the context of the present invention can mean scoring or cutting at the surface through only a selective portion of the material thickness, less than 0.100 inches, for example. In some aspects, the jacket cup may be first coated with a coating conventionally used in bullet manufacturing. In addition, although in certain aspects of the invention the jacket material is substantially uniform in thickness, the jacket wall may have a thickened sidewall and bottom to vary the upset performance.

In certain aspects of the invention, the jacket 11 is laser treated by imparting on and in the material of the jacket 11 patterns of annealing or hardening. As with the cutting and/or engraving, non-limiting examples of patterns are shown in FIGS. 3A-3I. It should be understood that the present invention also contemplates using the present methods of laser annealing and/or hardening the jacket to duplicate any pattern of cutting, scoring or weakening the jacket currently within the field of art. The laser annealing and/or hardening of the present invention may be done before the jacket 11 material is swaged into its final form or after. The patterns may also be imparts after the core 14 is inserted and even after the jacket/core is fitted with a cartridge case.

The laser hardening and/or annealing of jackets 11 following each of the patterns shown in FIGS. 3A-3I may result in a different terminal performance in regard to bullet upset upon contact with a target. The hardening and/or annealing may create lines of demarcation from which petals are formed upon upset. As such, criteria such as penetration, weight loss or fragmentation of the core upon upset, proper petal expansion and performance through barrier materials, and damage can be readily programmed by specifying certain patterns. Upset may also depend on other factors, such as projectile velocity and particular jacket alloy characteristics. As such, the present invention further includes the annealing/hardening of patterns in the jacket in combination with the choosing of certain jacket alloys and projectile velocities. In embodiments, the bullets may be swaged or pressed after annealing or hardening with the laser.

Annealing, in metallurgy and materials science, is a heat treatment that alters a material to increase its ductility and to make it more workable. It involves heating material to above its critical temperature, maintaining a suitable temperature, and then cooling. Annealing can induce ductility, soften material, relieve internal stresses, refine the structure by making it homogeneous, and improve cold working properties.

In the cases of copper, steel, silver, and brass, this process is performed by heating the material (generally until glowing) for a while and then letting it cool to room temperature in still air. Unlike ferrous metals—which must be cooled slowly to anneal—copper, silver[1] and brass can be cooled slowly in air, or quickly by quenching in water. In this fashion, the metal is softened and prepared for further work—such as shaping, stamping, or forming.

Hardening is a metallurgical and metalworking process used to increase the hardness of a metal. The hardness of a metal is directly proportional to the uniaxial yield stress at the location of the imposed strain. A harder metal will have a higher resistance to plastic deformation than a less hard metal.

In some aspects of the present invention, a method of forming the jacketed bullet 10 in accordance with the invention having an ogival front end portion 16 comprises the steps of:

a) drawing and providing a sheet metal blank made of a material suitable for use as ballistic cartridge jackets into a cup shaped jacket blank having a flat bottom and a generally uniform thickness wall;

b) forming a malleable metal core in the cup shaped jacket blank against said bottom by swaging or molding the core directly into the blank;

c) providing a laser system capable of finely annealing and/or hardening specific patterns in the material;

d) annealing and/or hardening the jacket material at the bottom with the laser system in the shape of a predetermined pattern into the jacket wall; and e) forcing the end of the blank containing the core against the bottom of the blank into a concave cavity of a forming tool to deform the end of the blank into an ogival front end portion 16 of the bullet 10.

Finally, the rear end 17 of the blank is crimped over the rear of the core 14 to lock it in place and ensure that the core 14 remains inserted within the front end 16 of the jacket 11.

In embodiments the jackets can be annealed and/or hardened prior to the step of joining the jacket to the core. Such prejoining annealing and/or hardening can allow more precision patterning of the jacket without disruption of the underlying core material.

In embodiments, the core material can be laser annealed and/or hardened prior to being jacketed. This can provide more precision, for example for guides for petaling, and allow for skipping or minimizing discrete steps, for example coning or swaging.

The bullet 10 is initially formed in a similar manner as described above in certain aspects. However, in other aspects, the jacket cup is first coated with a coating conventionally used in bullet manufacturing. In addition, although in certain aspects of the invention the jacket material is substantially uniform in thickness, the jacket wall may have a thickened sidewall and bottom to vary the upset performance.

In some aspects of the invention methods disclosed, the laser beam hardening includes the step of directing a beam onto the surface of the cup shaped jacket blank in the shape of the pattern at sufficiently high power densities to cause an incandescent reaction above the cup shaped jacket blank melting temperature with the cup shaped jacket blank; and limiting the incandescent reaction at a given area of the cup shaped jacket blank surface to a sufficiently short period of time to prevent any substantial melting.

In some aspects, the methods of annealing and/or hardening include the additional step of quenching the cup shaped jacket blank with a gaseous jet.

In some aspects, the methods of annealing and/or hardening exclude an additional step of quenching directly after annealing and/or hardening.

Methods may include heat treating a jacket for a jacketed bullet made of a transformation hardenable material without substantial distortion. Such method includes comprising the steps of: providing a metal blank, wherein the metal blank is made from a material suitable for use as cartridge bullet jackets; directing a laser beam to the outside surface of the metal blank at sufficiently high power densities so as to cause a substantially instantaneous incandescent reaction above the melting temperature of the material with the metal blank; and traversing the beam along the outside surface of the metal blank in a predetermined pattern, whereby a heat-treated pattern in the shape of the predetermined pattern is formed on the metal blank, limiting the dwell time of the beam at any given point on the surface of the metal blank to prevent any substantial melting of the metal blank, wherein the metal blank is shaped into a cup shape having an ogival front end portion and formed for suitable use in a jacketed bullet.

In the methods, the bullet being formed may have an added layer or layers of material that is particularly amenable to heat treating processes, for example ferrous based alloys or other alloys. The layer in the bullet can have a cap or jacket. In some embodiments, the cap layer may be below the copper or copper alloy jacket permitting the isolated regional heat treatment of the cap even though visually the cap or layer of material is not directly, visually, exposed. In an embodiment, the invention includes the selection of heat treatable alloys that are particularly amendable to heat treating, providing said alloy in a form near or at the surface of the bullet so that it is exposable to laser beam heating, and laser beam heating the bullet.

In the methods, the bullet being formed may have an added layer or layers of material welded together as part of the heat treatment process. This is particularly advantageous where layers do not necessary bond together well and may be subject to premature separation. Isolated heating to weld the layers together precludes the premature delamination and permit, for example, use of thinner layers.

Prior heat treating of the bullets may be supplemented with laser beam heat treating. For example in a process where bullets are heated and cooled for particular process times, discrete regional areas on the bullet can be provided with differential heating from the ambient conditions and the "gross" heating conventionally imparted to the bullets by wide spread radiant or convective heating.

For sake of identification, the patterns of FIGS. 3A-3I are identified as follows: 3A: circle; 3B: 4 point star; 3C: 5-point star; 3D: square; 3E: triangle; 3F: circled "X"; 3G: equilateral cross; 3H: confronting chevron; 3I: "X". It is contemplated in the present invention that the method of the present invention includes heat or laser treating patterns other than those shown, including symmetrically patterns spaced about point 18. Upon impact or upset, the patterns result in a preprogrammed formation of petals.

The present invention utilizes those suitable methods and apparatuses for laser cutting, engraving, hardening and annealing of material that are known to those skilled in the art. Non-limiting examples of methods and apparatuses for laser cutting, engraving, hardening and annealing of material include those shown in:

| U.S. Pat. No. 6,209,459 | U.S. Pat. Publ. 20080184873 | U.S. Pat. No. 6,613,165 | U.S. Pat. No. 6,013,140 | U.S. Pat. No. 6,728,273 |
|---|---|---|---|---|
| U.S. Pat. No. 7,259,351 | U.S. Pat. No. 4,151,014 | U.S. Pat. No. 6,772,041 | U.S. Pat. No. 7,932,139 | U.S. Pat. No. 8,304,686 |

-continued

| U.S. Pat. Publ. | U.S. Pat. No. | U.S. Pat. No. | U.S. Pat. No. | U.S. Pat. No. |
|---|---|---|---|---|
| 20110208171 | 5,984,916 | 4,304,978 | 4,405,386 | 4,467,168 |
| U.S. Pat. No. | U.S. Pat. No. | U.S. Pat. No. | U.S. Pat. Publ. | U.S. Pat. Publ. |
| 4,507,538 | 4,539,461 | 6,727,125 | 20060020259 | 20120234810 |
| U.S. Pat. Publ. | U.S. Pat. Publ. | WO | | |
| 20090281529 | 20100087802 | 2004044515A2 | | |

The present invention also includes utilizing the methods of cutting or engraving and/or annealing or hardening to impart patterns or paths of weakening into jackets and/or cores to promote and program upset characteristics. Nonexclusive examples of paths and formation of segments in cores may be found in U.S. Pat. No. 6,805,057, which is incorporated herein by reference in its entirety.

In some aspects of the invention, the jacket 11 is laser treated by laser cutting patterns, including the patterns shown, into the material of the jacket. This allows the jacket to split along predetermined lines.

In some aspects of the invention, the jacket 11 is laser treated by laser engraving patterns, including the patterns shown, into the material of the jacket. This also allows the jacket to split along predetermined lines.

The present invention also contemplates using a combination of laser engraving and laser cutting to tailor the jacket for predetermined upset configurations.

In some aspects of the invention, the jacket 11 is laser heat treated by laser annealing patterns, including the patterns shown, into the material of the jacket. This allows the jacket to split along predetermined lines.

In some aspects of the invention, the jacket 11 is laser heat treated by laser hardening patterns, including the patterns shown, into the material of the jacket. This also allows the jacket to split along predetermined lines.

The present invention also contemplates using a combination of laser hardening and laser annealing to tailor the jacket for predetermined upset configurations.

It should be understood that in the methods and bullets herein may be further modified to provide for a hollow point feature at point 18 in the bullet. Methods of doing so are well within the knowledge of those skilled in the art.

Examples of suitable jacket material are, but not limited to, copper, aluminum, copper alloys, aluminum alloys, brass, tin, tungsten, zinc, iron, and steel and alloys thereof and combinations thereof.

The jacket 11 on the bullet 10 of the invention may be coated with a metal oxide coating or other conventional coatings which increases the surface adhesion of the core 14 to the inner surface of the jacket 11. This promotes the flow of core 14 material outward with formation of the jacket 11 petals upon upset. Suitable coatings include, but not limited to, metal oxides.

Examples of other suitable core materials include, without limitation, materials suitable for bullet cores, such as lead, lead alloys, tin, tin alloys, tungsten, tungsten alloys, metal containing composites, copper, brass, bronze, steel, and aluminum and alloys and combinations thereof.

Suitable cartridge cases 12 include any conventional cartridge case and are readably known to those skilled in the art.

In some aspects, the bullets made by the methods herein may be non-bonded jacketed bullets, wherein the core is not bonded to the jacket. In some aspects, the bullets made by the methods herein may be bonded jacketed bullets, wherein the core is bonded to the jacket.

In some aspects, the patterns may be applied to the insider of the jacket.

The bullets of the present invention, including all of the aspects and embodiments, are adapted for mounting in a cartridge case for firing. The states of the projectiles aspects and embodiments described are unspent, unfired and prefired states and are undeformed and ready for conventional use.

The above references in all sections of this application are herein incorporated by references in their entirety for all purposes.

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment (s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

The invention claimed is:

1. A method of forming a jacketed bullet having an ogival front end portion, comprising the steps of:
   a) providing and drawing a sheet metal blank into a cup shaped jacket blank, the cup shaped jacket blank having a first end portion being closed, a second end portion being open and a wall, wherein the sheet metal blank is made from a material suitable for use as cartridge bullet jackets;
   b) providing a core having a first end and a second end;

c) forming the core in the cup shaped jacket blank against said first end portion by swaging or molding the core directly into the cup shaped jacket blank;

d) providing a scanning laser system capable of finely annealing and/or hardening specific patterns in the sheet metal blank material; and e) laser annealing and/or laser hardening a portion of the cup shaped jacket blank at the first end portion with a laser beam emitted from the scanning laser system in a shape of a predetermined pattern, the cup shaped jacket blank forming a jacket of the jacketed bullet, wherein the first end portion forms at least a portion of the ogival front end portion, such that at least a portion of the ogival front end portion includes a pattern of laser annealed and/or laser hardened material consistent with the predetermined pattern.

2. The method of claim 1, wherein step e) comprises laser annealing the portion of the cup shaped jacket blank at the first end portion with the laser beam emitted from the scanning laser system in the shape of the predetermined pattern, the laser annealing being performed without apparent removal of jacket blank material.

3. The method of claim 1, wherein step e) comprises laser hardening the portion of the cup shaped jacket blank at the first end portion with the laser beam emitted from the scanning laser system in the shape of the predetermined pattern, the laser hardening being performed without apparent removal of jacket blank material.

4. The method of claim 3, wherein step e) comprises directing the laser beam onto a surface of the cup shaped jacket blank in the shape of the predetermined pattern at sufficiently high power densities to cause an incandescent reaction above the cup shaped jacket blank melting temperature with the cup shaped jacket blank; and limiting the incandescent reaction at a given area of the cup shaped jacket blank surface to a sufficiently short period of time to prevent any substantial melting.

5. The method of claim 3, including the additional step of quenching the portion of cup shaped jacket blank.

6. The method of claim 1, further comprising the step of:
forcing the first end portion of the cup shaped jacket blank containing the core against the first end portion of the cup shaped jacket blank into a concave cavity of a forming tool to deform the first end portion of the cup shaped jacket blank into the ogival front end portion of the bullet, the forcing step being performed before or after the laser annealing and/or laser hardening.

7. The method of claim 6, further comprising the step of crimping a second end portion of the cup shaped jacket blank over the core to lock it in place and ensure that the core remains inserted within the first end portion of the cup shaped jacket blank.

8. The method of claim 1, the sheet metal blank being made of steel.

9. The method of claim 8, wherein step e) comprises laser annealing the portion of the cup shaped jacket blank at the first end portion with the laser beam emitted from the scanning laser system in the shape of the predetermined pattern, such that the at least a portion of the ogival front end portion includes a pattern of laser annealed material, wherein at least a portion of the material of the pattern of laser annealed material is ductile material.

10. The method of claim 9, the ductile material comprises a thickness of the jacket extending inward from an outer surface of the jacket.

11. The method of claim 10, the ductile material forming a plurality of axial lines within the jacket material.

12. The method of claim 10, the ductile material forming an insular shape in the jacket material, encompassing a forward most portion of the ogival front end portion.

13. The method of claim 8, wherein step e) comprises laser hardening the portion of the cup shaped jacket blank at the first end portion with the laser beam emitted from the scanning laser system in the shape of the predetermined pattern, such that the at least a portion of the ogival front end portion includes a pattern of laser hardened material, wherein at least a portion of the material of the pattern of laser hardened material is brittle material.

14. The method of claim 13, the hardened material comprises a thickness of the jacket extending inward from an outer surface of the jacket.

15. The method of claim 14, the hardened material forming a plurality of axial lines within the jacket material.

16. The method of claim 14, the hardened material forming an insular shape in the jacket material, encompassing a forward most portion of the ogival front end portion.

17. The method of claim 1, wherein the pattern of laser annealed and/or laser hardened material is not legible indicia.

\* \* \* \* \*